(12) United States Patent
Carbune et al.

(10) Patent No.: US 12,555,577 B2
(45) Date of Patent: *Feb. 17, 2026

(54) HOTPHRASE TRIGGERING BASED ON A SEQUENCE OF DETECTIONS

(71) Applicant: Google LLC, Mountain View, CA (US)

(72) Inventors: Victor Carbune, Zürich (CH); Matthew Sharifi, Kilchberg (CH)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/323,725

(22) Filed: May 25, 2023

(65) Prior Publication Data

US 2023/0298588 A1    Sep. 21, 2023

Related U.S. Application Data

(63) Continuation of application No. 17/118,251, filed on Dec. 10, 2020, now Pat. No. 11,694,685.

(51) Int. Cl.
*G10L 15/00* (2013.01)
*G06F 1/3231* (2019.01)
(Continued)

(52) U.S. Cl.
CPC ............ *G10L 15/22* (2013.01); *G06F 1/3231* (2013.01); *G06F 16/24522* (2019.01);
(Continued)

(58) Field of Classification Search
CPC ... G10L 15/26; G10L 15/22; G10L 2015/088; G10L 15/30; G10L 15/32;
(Continued)

(56) References Cited

U.S. PATENT DOCUMENTS 7,487,091 B2    2/2009   Miyazaki
9,916,831 B2*   3/2018   Panin .................... H04M 11/10
(Continued)

FOREIGN PATENT DOCUMENTS

JP    2006215499 A    8/2006
JP    2019-133156 A   8/2019
(Continued)

OTHER PUBLICATIONS

International Search Report and Written Opinion for the related Application No. PCT/US2021/060233, Dated: Mar. 4, 2022, 119 pages.
(Continued)

*Primary Examiner* — Michael Ortiz-Sanchez
(74) *Attorney, Agent, or Firm* — Honigman LLP; Brett A. Krueger; Grant Griffith

(57) ABSTRACT

A method includes receiving audio data corresponding to an utterance spoken by the user and captured by the user device. The utterance includes a command for a digital assistant to perform an operation. The method also includes determining, using a hotphrase detector configured to detect each trigger word in a set of trigger words associated with a hotphrase, whether any of the trigger words in the set of trigger words are detected in the audio data during the corresponding fixed-duration time window. The method also includes determining identifying, in the audio corresponding to the utterance, the hotphrase when each other trigger word in the set of trigger words was also detected in the audio data. The method also includes triggering an automated speech recognizer to perform speech recognition on the audio data when the hotphrase is identified in the audio data corresponding to the utterance.

20 Claims, 4 Drawing Sheets

(51) Int. Cl.
*G06F 16/2452* (2019.01)
*G10L 15/16* (2006.01)
*G10L 15/22* (2006.01)
*G10L 15/28* (2013.01)
*G10L 15/08* (2006.01)

(52) U.S. Cl.
CPC ............ *G10L 15/16* (2013.01); *G10L 15/285* (2013.01); *G10L 2015/088* (2013.01); *G10L 2015/223* (2013.01)

(58) Field of Classification Search
CPC . G10L 2015/223; G10L 15/16; G10L 15/285; G10L 15/00; G10L 25/30; G10L 15/28; G10L 15/222; G10L 2015/225; G06F 1/3231; G06F 16/00; G06F 16/24; G06F 16/24522; G06F 16/245; G06F 3/16; G06F 3/167; G06F 40/289; G06F 16/3344; G06F 16/3329; G06F 16/334; G06F 16/2455; G06F 40/295; G06F 16/332; G06F 16/243; G06F 3/0237; G06F 16/90332; G06F 16/903; G06F 16/242; G06F 16/2453; G06F 16/90335; G06N 20/00
See application file for complete search history.

(56) References Cited

U.S. PATENT DOCUMENTS

| | | | |
|---|---|---|---|
| 10,276,175 B1* | 4/2019 | Garcia | G10L 19/018 |
| 11,488,600 B2* | 11/2022 | Neumann | G06F 3/167 |
| 2004/0199388 A1* | 10/2004 | Armbruster | G10L 15/22 |
| | | | 704/E15.04 |
| 2015/0095027 A1 | 4/2015 | Parada San Martin et al. | |
| 2019/0043488 A1 | 2/2019 | Bocklet et al. | |
| 2019/0266240 A1 | 8/2019 | Georges et al. | |
| 2020/0175962 A1* | 6/2020 | Thomson | G10L 15/30 |
| 2020/0273447 A1 | 8/2020 | Zhou | |
| 2020/0302913 A1 | 9/2020 | Marcinkiewicz | |
| 2020/0395006 A1 | 12/2020 | Smith et al. | |
| 2021/0225363 A1 | 7/2021 | Iwase et al. | |

FOREIGN PATENT DOCUMENTS

| | | |
|---|---|---|
| JP | 2019-185011 A | 10/2019 |
| JP | 2020-012954 A | 1/2020 |
| JP | 2020-160387 A | 10/2020 |
| WO | 0101389 A2 | 1/2001 |
| WO | 2019079957 A1 | 5/2019 |
| WO | 2019239656 A1 | 12/2019 |

OTHER PUBLICATIONS

USPTO. Office Action relating to U.S. Appl. No. 17/118,251, dated Dec. 13, 2022.
Japanese Patent Office, Office Action for Application No. 2023-535570 dated Aug. 5, 2024.
Japanese Patent Office, Office Action for Application No. 2024-215360 dated Jul. 29, 2025.

* cited by examiner

HOTPHRASE TRIGGERING BASED ON A SEQUENCE OF DETECTIONS

CROSS-REFERENCE TO RELATED APPLICATIONS

This patent application is a continuation of, and claims priority under 35 U.S.C. § 120 from, U.S. patent application Ser. No. 17/118,251, filed on Dec. 10, 2020. The disclosure of this prior application is considered part of the disclosure of this application and is hereby incorporated by reference in its entirety.

TECHNICAL FIELD

This disclosure relates to hotphrase triggering based on a sequence of detections.

BACKGROUND

A speech-enabled environment permits a user to only speak a query or command out load and a digital assistant will field and answer the query and/or cause the command to be performed. A speech-enabled environment (e.g., home, workplace, school, etc.) can be implemented using a network of connected microphone devices distributed throughout various rooms and or areas of the environment. Through such a network of microphones, a user has the power to orally query the digital assistant from essentially anywhere in the environment without the need to have a computer or other device in front of him/her or even nearby. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Once awake, the devices can proceed to perform more expensive processing such as full on-device automated speech recognition (ASR) or server-based ASR. For example, while cooking in the kitchen, a user might speak a designated hotword "Hey Computer" to trigger a speech-enabled device to wake-up and then ask the digital assistant running on the speech-enabled device "please set timer for 20-minutes" and, in response, the digital assistant will confirm that the timer has been set (e.g., in a form of a synthesized voice output) and then alert (e.g., in the form of an alarm or other audible alert from an acoustic speaker) the user once the timer lapses after 20-minutes.

SUMMARY

One aspect of the disclosure provides a method for detecting a hotphrase. The method includes receiving, at data processing hardware of a user device associated with a user, audio data corresponding to an utterance spoken by the user and captured by the user device. The utterance includes a command for a digital assistant to perform an operation. During each of a plurality of fixed-duration time windows of the audio data: the method includes determining, by the data processing hardware, using a hotphrase detector configured to detect each trigger word in a set of trigger words associated with a hotphrase, whether any of the trigger words in the set of trigger words are detected in the audio data during the corresponding fixed-duration time window; when one of the trigger words in the set of trigger words associated with the hotphrase is detected in the audio data during the corresponding fixed-duration time window, determining, by the data processing hardware, whether each other trigger word in the set of trigger words associated with the hotphrase was also detected in the audio data; and when each other trigger word in the set of trigger words was also detected in the audio data, identifying, by the data processing hardware, in the audio data corresponding to the utterance, the hotphrase. The method also includes triggering, by the data processing hardware, an automated speech recognizer (ASR) to perform speech recognition on the audio data when the hotphrase is identified in the audio data corresponding to the utterance.

Another aspect of the disclosure provides a system for detecting a hotphrase in audio data. The system includes data processing hardware and memory hardware in communication with the data processing hardware and storing instructions that when executed on the data processing hardware cause the data processing hardware to perform operations. The operations include receiving audio data corresponding to an utterance spoken by a user and captured by a user device associated with the user. The utterance includes a command for a digital assistant to perform an operation. During each of a plurality of fixed-duration time windows of the audio data: the operations also include determining, using a hotphrase detector configured to detect each trigger word in a set of trigger words associated with a hotphrase, whether any of the trigger words in the set of trigger words are detected in the audio data during the corresponding fixed-duration time window; when one of the trigger words in the set of trigger words associated with the hotphrase is detected in the audio data during the corresponding fixed-duration time window, determining whether each other trigger word in the set of trigger words associated with the hotphrase was also detected in the audio data; and when each other trigger word in the set of trigger words was also detected in the audio data, identifying, in the audio data corresponding to the utterance, the hotphrase. The operations also include triggering an automated speech recognizer (ASR) to perform speech recognition on the audio data when the hotphrase is identified in the audio data corresponding to the utterance.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
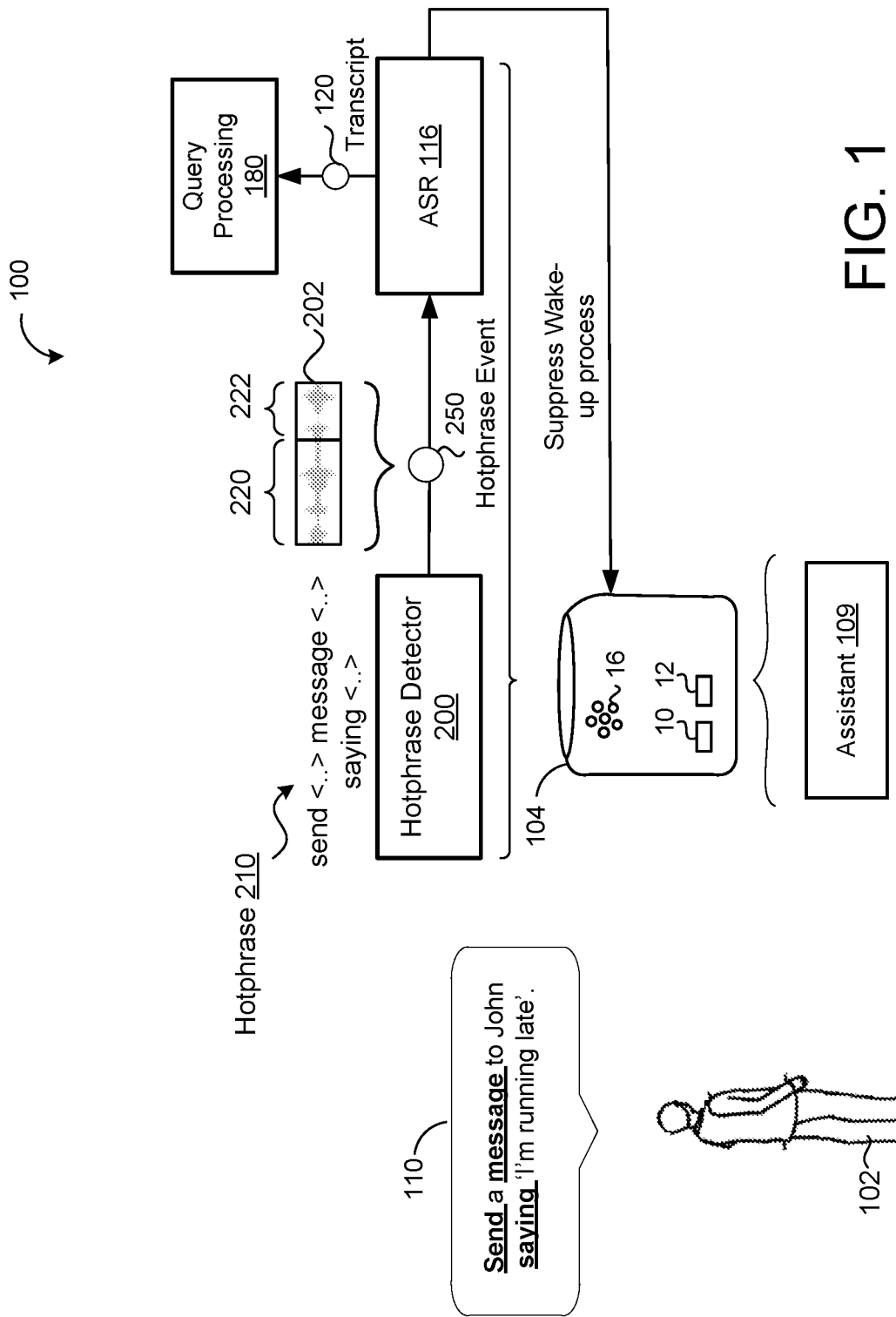
FIG. 1 is an example system including a hotphrase detector for detecting hotphrases in audio.

Through such a network of one or more assistant-enabled devices, a user has the power to speak a query or command out loud and have a digital assistant field and answer the query and/or cause the command to be performed. Ideally, the user should be able to communicate with the digital assistant as if they were talking to another person by speaking the query/command directed toward the assistant-enabled device. However, it is challenging for the digital assistant to always be responsive to the user due to the fact that it is prohibitively expensive to run full speech recognition continuously on an assistant-enabled device having constrained resources, such as a smart phone or smart watch.

Accordingly, these assistant-enabled devices generally operate in a sleep state or a hibernation state where a low-powered hotword model is capable of detecting a predefined hotword in audio without running speech recognition. Upon detecting the predefined hotword in a spoken utterance, the assistant-enabled devices can wake-up and proceed to perform more expensive processing such as full on-device automated speech recognition (ASR) or server-based ASR. In order to alleviate the requirement of having users speak the predefined hotword, and thus create experiences which support always-on speech, a number of current efforts are focused on activating digital assistants directly for a narrow set of common phrases (e.g., "set a timer", "lower volume", etc.). While in a low-power state, an assistant-enabled device may run a low-powered model, such as a compact hotphrase (or warm word) model or a low-powered speech recognizer, that is capable of detecting/recognizing a fixed hotphrase in audio. When the fixed hotphrase is detected/recognized by the low-powered model, the speech-enabled device triggers a higher-powered, more accurate model to wake up and validate the presence of the fixed phrase in the audio.

One challenge with hotphrase detection models is that they do not afford any flexibility since they require the user to speak the precise command that the hotphrase model is trained to recognize. That is, a user must speak the exact hotphrase which is expected by the hotphrase model, without the ability to accept variation/flexibility on different phrasings. In many scenarios, the sequence of words for a given command will not always be spoken consecutively in an utterance, thereby making it difficult to represent the given command with a hotphrase. For instance, when performing a command to send a text message, the user might speak "send a message to John saying I'm running late". Here, the command includes fixed parts as well as some variable parts which are difficult to detect/recognize using conventional lower-powered hotphrase detection models. Accordingly, conventional lower-powered hotphrase detection models lack flexibility and support only a limited number of different hotphrases.

Implementations herein are directed toward enabling more flexible hotword detection models capable of running at low-power while allowing users to more naturally communicate with an always-on assistant-enabled device (AED) with increased flexibility. More specifically, an AED may execute a first stage hotphrase detector that either: runs a single hotword detection model configured to detect multiple different hotwords in an utterance; or runs a set of hotword detection models in parallel where each hotword detection model is configured to detect a corresponding hotword in an utterance. When the set of hotword detection models detects multiple hotwords in a given utterance, the first stage hotphrase detector may aggregate the multiple hotwords to detect a full hotphrase. That is, a full hotphrase may be detected when multiple hotwords are detected in an expected order and within a predefined time window, thereby enabling the AED to wake-up from a low-power state and execute a second-stage hotphrase detector to validate the detected hotphrase. The second-stage hotphrase detector may be used to verify the hotwords detected by the first stage and/or allow for recognizing parameters within the predefined time window which were not detected/recognized by the first stage hotphrase detector. These parameters may include, for instance, intermediary words/terms that the hotword models are not trained to detect, but are otherwise dispersed in the spoken utterance as part of the issued query/command.

The hotphrase detector may be activated/initialized to detect the multiple hotwords/trigger words based on context related to an application currently in use and/or content displayed on a screen of the AED. For example, if the user views "end message" and "answer the call" displayed on a screen, the hotphrase detector may activate the words send/answer/call/message.

FIG. 1 shows an example system 100 that includes an assistant-enabled device (AED) 104 executing a digital assistant 109 that a user 102 may interact with through speech. In the example shown, the AED 104 corresponds to a smart speaker. However, the AED 104 can include other computing devices, such as, without limitation, a smart phone, tablet, smart display, desktop/laptop, smart watch, smart appliance, headphones, or vehicle infotainment device. The AED 104 includes data processing hardware 10 and memory hardware 12 storing instructions that when executed on the data processing hardware 10 cause the data processing hardware 10 to perform operations. The AED 104 includes an array of one or more microphones 16 configured to capture acoustic sounds such as speech directed toward the AED 104. The AED 104 may also include, or be in communication with, an audio output device (e.g., speaker) that may output audio for playback to the user 102.

IN the example shown, the user 102 speaks an utterance 110, "Send a message to John saying 'I'm running late' in the vicinity of the AED 104. The microphone 16 of the AED 104 receives the utterance 110 and processes audio data 202 that corresponds to the utterance 110. The initial processing of the audio data may involve filtering the audio data and converting the audio data from an analog signal to a digital signal. As the AED 104 processes the audio data, the AED may store the audio data in a buffer of the memory hardware 12 for additional processing. With the audio data in the buffer, the AED 104 may use a hotphrase detector 200 to detect whether the audio data 202 includes a hotphrase. More specifically, the hotphrase detector is configured to detect, in the audio data, each trigger word in a set of trigger words associated with the hotphrase during a fixed-duration time window 220 of the audio data 202. Thus, the hotphrase detector 200 is configured to identify trigger words that are included in the audio data without performing speech recognition on the audio data. In the example shown, the hotphrase detector 200 may determine that the utterance 110 "Send a message to John saying 'I'm running late'" includes the hotphrase 210 "send < . . . > message < . . . > saying < . . . >" if the hotphrase detector 210 detects acoustic features in the audio data that are characteristic of each of the trigger words "send", "message", and "saying" during the fixed-duration time window 220 of the audio data 202. The acoustic features may be mel-frequency cepstral coefficients (MFCCs) that are representations of short-term power spectrums of the utterance 110 or may be mel-scale filterbank energies for the utterance 110. While the examples depict each trigger word as a complete word, trigger words may also include sub-words or wordpieces.

As used herein, a hotphrase 210 refers to a narrow set of trigger words (e.g., warm words) that the AED 104 is configured to recognize/detect in audio without performing speech recognition to directly trigger a respective action operation. That is, the hotphrase 210 serves the dual purpose of an invocation phrase to wake the AED 104 from a low-power state (e.g., sleep or hibernation state) and a command specifying an operation for the digital assistant 109 to perform. In the example, the hotphrase 210 "send < . . . > message < . . . > saying" allows the user to invoke the AED 104 to trigger performance of the respective operation (e.g., sending message contents to a recipient) without requiring the user to prefix the utterance 110 with a predefined invocation phrase (e.g., hotword, wake word) to first wake-up the AED 104 to process subsequent audio corresponding to the command/query.

Notably, the hotphrase detector 200 is configured to detect the hotphrase 210 so long as each trigger word in a set of trigger words associated with the hotphrase 210 is detected in the audio data in a sequence that matches a predefined sequential order associated with the hotphrase 210 and during/within the fixed-duration time window 220. That is, in addition to fixed parts corresponding to the set of trigger words the hotphrase detector 200 is configured to detect, the utterance 110 may also include some variable parts that are not associated with the hotphrase such as words/terms that are spoken by the user 102 between a first trigger word (e.g., "send") and a last trigger word (e.g., "saying"). As such, the hotphrase detector 200 does not require the user 102 to speak the precise command that the hotphrase detector 200 is trained to detect. That is, the hotphrase detector 200 has the ability to accept variation/flexibility on different phrasings associated with the hotphrase, and therefore does not require the user to speak the set of trigger words consecutively and permits the user to embed open ended parameters inside the hotphrase. While some hotphrases are usually spoken consecutively in an utterance (e.g., "volume up", "volume down", "next track", "set timer", "stop alarm", etc.), the hotphrase detector 200 disclosed herein is also capable of detecting a sequence of trigger words for hotphrases that will not always be spoken consecutively, thereby permitting the AED 104 to detect a wider variety of hotphrases 210. For instance, in the example of FIG. 1, the user 102 could convey the same command for the digital assistant 109 to perform the operation by speaking a slightly different utterance, "Please send a nice message to my colleague John saying 'I'm running late'". Here, this utterance still includes the set of trigger words associated with the hotphrase 110 "send < . . . > message < . . . > saying" but with a different variety of words/terms spoken by the user 102 between the first trigger word (e.g., "send") and the last trigger word (e.g., "saying"). Accordingly, the hotphrase detector 200 may still detect the hotphrase 210 to invoke the AED 104 to wake-up and trigger performance of the respective operation (e.g., sending message contents to a recipient).

The hotphrases detector 200 may continuously run/execute on the AED 104 while the AED 104 is in the low-power state to listen for each trigger word in the set of trigger words in streaming audio. When the AED 104 includes a battery-powered device, such as a smart phone, the hotphrase detector 200 may execute on a low power hardware such as a digital signal processor (DSP) chip. The hotphrase detector 200 may run/execute on an application process (AP)/CPU of other types of AEDs, but consume less power and require less processing than performing speech recognition.

When the hotphrase detector 200 identifies the hotphrase 210 in the audio data 202 by detecting each trigger word in the set of trigger words during the fixed-duration time window 220 of the audio data 202, the AED 204 may trigger a wake-up process to initiate speech recognition on the audio data 202 that corresponds to the utterance 110. For example, an automated speech recognizer (ASR) 116 running on the AED 104 may perform speech recognition on the audio data 202 as a validation stage to confirm the presence of the hotphrases 210 in the audio data 202. The hotphrase detector 200 may rewind the audio data buffered in the memory hardware 12 to a time at or before the first trigger word was detected and provide the audio data 202 commencing at or before the first trigger word was detected to the ASR 116 for perform processing thereon. Thus, the buffered audio data 202 provided to the ASR 116 may include some preamble audio commencing before the first trigger word. The duration of the preamble audio may be dependent on the specific hotphrase 210 based on where the first trigger word is expected to be in relation to other terms in a given utterance. The audio data 202 provided to the ASR 116 includes a portion corresponding to the preamble audio and the fixed-duration time window 220 characterizing the detected set of trigger words and a subsequent portion 222 that includes the message contents "I'm running late".

Here, the ASR 116 generates a transcription 120 of the utterance 110 by processing the audio data 202 and determines whether each trigger word in the set of trigger words associated with the hotphrase 210 is recognized in the transcription 120. The ASR 116 may also process the portion 222 of the audio data 202 corresponding to the contents of the message "I'm running late" subsequent to the last trigger word (e.g., "saying") for inclusion in the transcription 120. When the ASR 116 determines that each trigger word in the set of trigger words is recognized in the transcription 120, the ASR 116 may provide the transcription 120 to query processing 180 to perform query interpretation on the transcription 120 for identifying the command for the digital assistant 109 to perform the operation. The query processing 180 may execute a dedicated model configured to receive the transcription 120 of the utterance 110 and classify a likelihood that the utterance 110 corresponds to a query/command-like utterance directed toward the digital assistant 109. The query processing 180 may additionally or alternatively perform query interpretation through natural language processing (NLP) layers for performing intent classification. In the example, the query interpretation performed on the transcription 120 by the query processing 180 may identify the command to send a message to a recipient device associated with John and provide the portion of the transcription 120 that includes the message contents "I'm running late" to a messaging application for transmission to the recipient device associated with John.

On the other hand, when the ASR 116 determines that one or more of the trigger words in the set of trigger words are not recognized in the transcription 120, the ASR 116 determines a mis-trigger event occurred at the hotphrase detector 200, and therefore, the hotphrase 210 was not spoken in the user's utterance 110. In the example shown, the ASR 116 instructs the AED 104 to suppress the wake-up process and revert back to the low-power state upon determining the mis-trigger event. In some examples, when one or more of the trigger words detected by the hotphrase detector 200 were mis-recognized by the ASR, the AED 104 executes a refinement process to fine-tune the hotphrase detector based on each trigger word misrecognized by the ASR.

Optionally, the ASR 116 may execute on a remote server (not shown) in communication with the AED 104 via a network. In some examples, a computationally more intensive second stage hotphrase detector confirms the presence of the hotphrase 210 in the audio data 202 in addition to or in lieu of the validation performed by the ASR 116.

Figure 2:
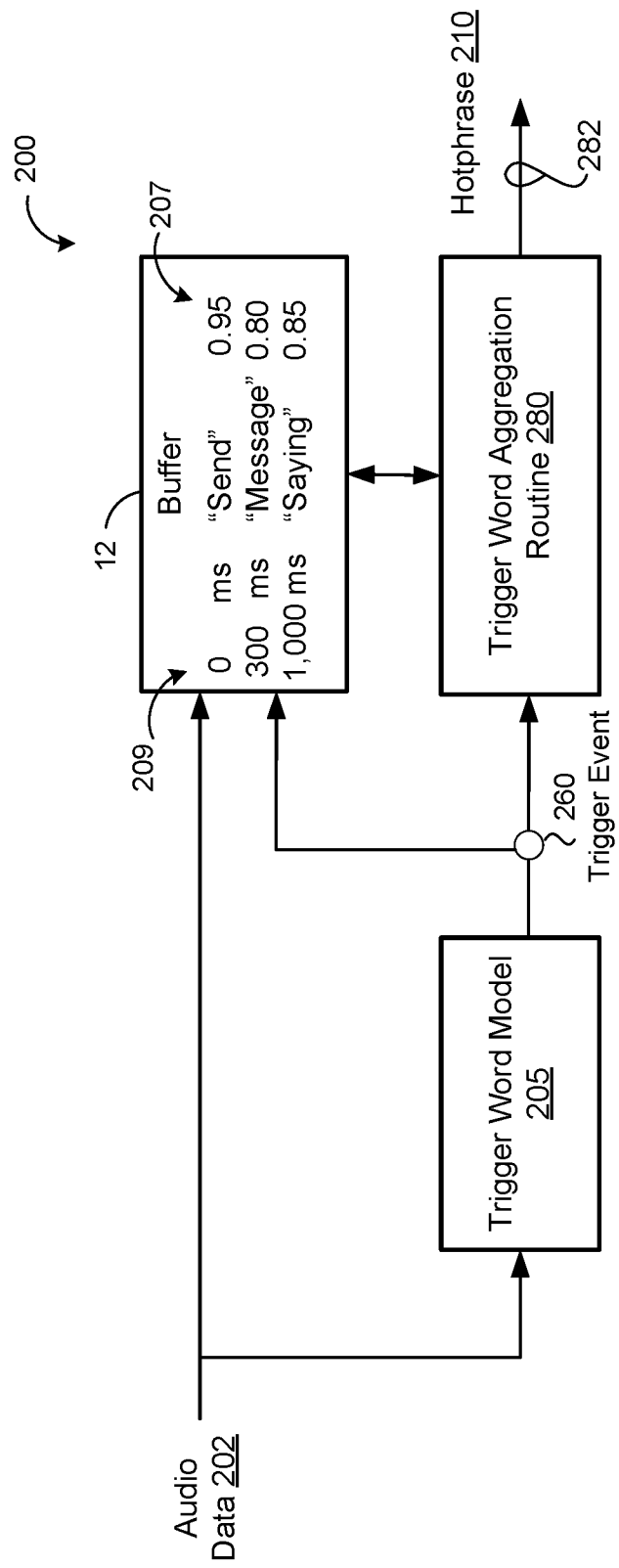
FIG. 2 is an example of the hotphrase detector of FIG. 1.

Referring to FIG. 2, in some implementations, the hotphrase detector 200 includes a trigger word detection model 205 trained to detect each trigger word in the set of trigger words associated with the hotphrase 210. Audio data 202 converted from streaming audio captured by the microphone 16 of the AED 104 is buffered at buffer and fed to the trigger word detection model 205. The buffer may reside on the memory hardware 12. The model 205 is configured to output confidence scores 207 for a range of supported trigger words that includes the set of trigger words associated with the hotphrase 210. The range of supported trigger words may include other trigger words for different sets of trigger words associated with one or more additional hotphrases. Some trigger words may belong to multiple sets of trigger words. For instance, the trigger word "message" may also belong to a different set of trigger words associated with another hotphrase "dictate < . . . > message". In some examples, the model 205 includes a fixed window audio model having several neural network layer blocks configured to process audio frames for generating a classification (e.g., confidence score 207) every N ms of audio. Here, the neural network layer blocks may include convolutional blocks. At each of a plurality of time steps, an output layer of the model may output a confidence score 207 for each trigger word supported. Thus, each trigger word supported by the model may be referred to as a target class. When the model 205 outputs a respective confidence score 207 for a trigger word that satisfies a trigger word confidence threshold, the hotphrase detector 200 detects a respective trigger event 260 indicating the presence of the trigger word in the audio data 202 and buffers the respective trigger event 260 in buffer.

In the example shown, each respective trigger event 260 in buffer indicates the respective confidence score 207 for the corresponding trigger word and a respective time stamp 209 indicating when the corresponding trigger word was detected in the audio data 202. For instance, when assuming the trigger word confidence threshold is equal to 0.7: a respective trigger event 260 may be detected when the model 205 outputs a respective confidence score equal to 0.95 for the trigger word "send" at zero (0) milliseconds (ms) indicating when the current fixed-duration time window 220 commences; a respective trigger event 260 may be detected when the model 205 outputs a respective confidence score equal to 0.8 for the trigger word "message" at three-hundred (300) ms; and a respective trigger event 260 may be detected when the model 205 outputs a respective confidence score equal to 0.85 for the trigger word "saying" at 1,000 ms. Notably, the hotphrase detector 200 does not initiate the wake-up process responsive to detecting a trigger event 260 for each individual trigger word.

The hotphrase detector 200 is further configured to execute a trigger word aggregation routine 280 each time the trigger word detection model 205 detects a respective trigger event 260. Here, the routine 280 is configured to: determine whether a respective trigger event 260 for each other corresponding trigger word in the set of trigger words is in buffer; and when the respective trigger event 260 for each other corresponding trigger word in the set of trigger words is also in buffer, determine a hotphrase confidence score 282 indicating a likelihood that the utterance spoken by the user includes the hotphrase 210. In some examples, the hotphrase detector 200 identifies the hotphrase in the audio data 202 when the hotphrase confidence score 282 satisfies a hotphrase confidence threshold.

The routine 280 may be configured to determine the hotphrase confidence score 282 based on the respective trigger word confidence score 207 and the respective time stamp 209 indicated by the respective trigger event 260 in buffer for each corresponding trigger word in the set of trigger words. In practice, the respective trigger event 260 may include multiple respective time stamps 209 indicating where a trigger word confidence score 207 exceeds the trigger word confidence threshold, permitting consecutive detects to be combined using multiple techniques. For instance, the time stamps 209 associated with the highest trigger word confidence score 207 may be indicated by the trigger event 260 stored in buffer. Executing the trigger word aggregation routine 280 may include executing a neural network-based model. The neural network-based model could include a sequence-based machine learning model, such as a model having a recurrent neural network (RNN) architecture. In other examples, executing the trigger word aggregation routine 280 includes executing a grammar or heuristic-based model. The routine 280 also considers the sequence at which the trigger words were detected during the fixed-duration time window 220. That is, the sequence of the set of trigger words detected in the audio data 202 must match a predefined sequential order associated with the hotphrase 210 in order to identify the hotphrase 210. For instance, in the example shown, upon receiving the trigger event 260 indicating detection of the trigger word "saying", the routine 280 may use the respective timestamps 209 in the buffer to determine that that the trigger word "message" was detected after the trigger word "send" and before the trigger word "saying".

In some examples, the hotphrase confidence score 282 generated by the routine 280 is further based on a respective time period between each pair of adjacent trigger words in the set of trigger words that were detected in the audio data. For instance, the routine 280 may compare each respective time period to a corresponding reference time period that is expected between the pair of adjacent trigger words for the particular phrase. That is, for the hotphrase 210 "send < . . . > message < . . . > saying", the reference time period expected between the trigger words "send" and "message" is shorter than the reference time period expected between the trigger words "message" and "saying". The routine 280 may also constrain a hotphrase based on a maximum time period between a specific pair of trigger words.

The grammars (e.g., target classes/trigger words) for the trigger word detection model 205 may be manually constructed or learned/trained. When learned, AED queries for a particular vertical or intent may be used. For instance, to represent a command to dictate and send messages to recipients in a hand free manner, query transcripts of users speaking commands to dictate and send messages may be leveraged to learn a smallest set of trigger words that cover a maximum fraction of the query transcripts for the send message command and for use by the trigger word detection model 205. That is, the smallest set of trigger words covering the maximum fraction of the transcripts are associated with the trigger words that occur in the transcripts with the highest-frequency. In another example, when constructing the trigger word detection model 205 to support low power commands for playing music, query transcripts for play music commands may be obtained to identify a smallest set of trigger words covering a maximum fraction of the transcripts in the obtained query transcripts. Notably, a trigger word detection model 205 may be constructed on-device and/or on a per-user basis so that the trigger word detection model 205 is constructed to detect personalized hotphrases spoken by the user and/or users of a particular AED. Trigger word detection models for common/generic hotphrases may also be detected server side and pushed to a population of AEDs.

Figure 3:
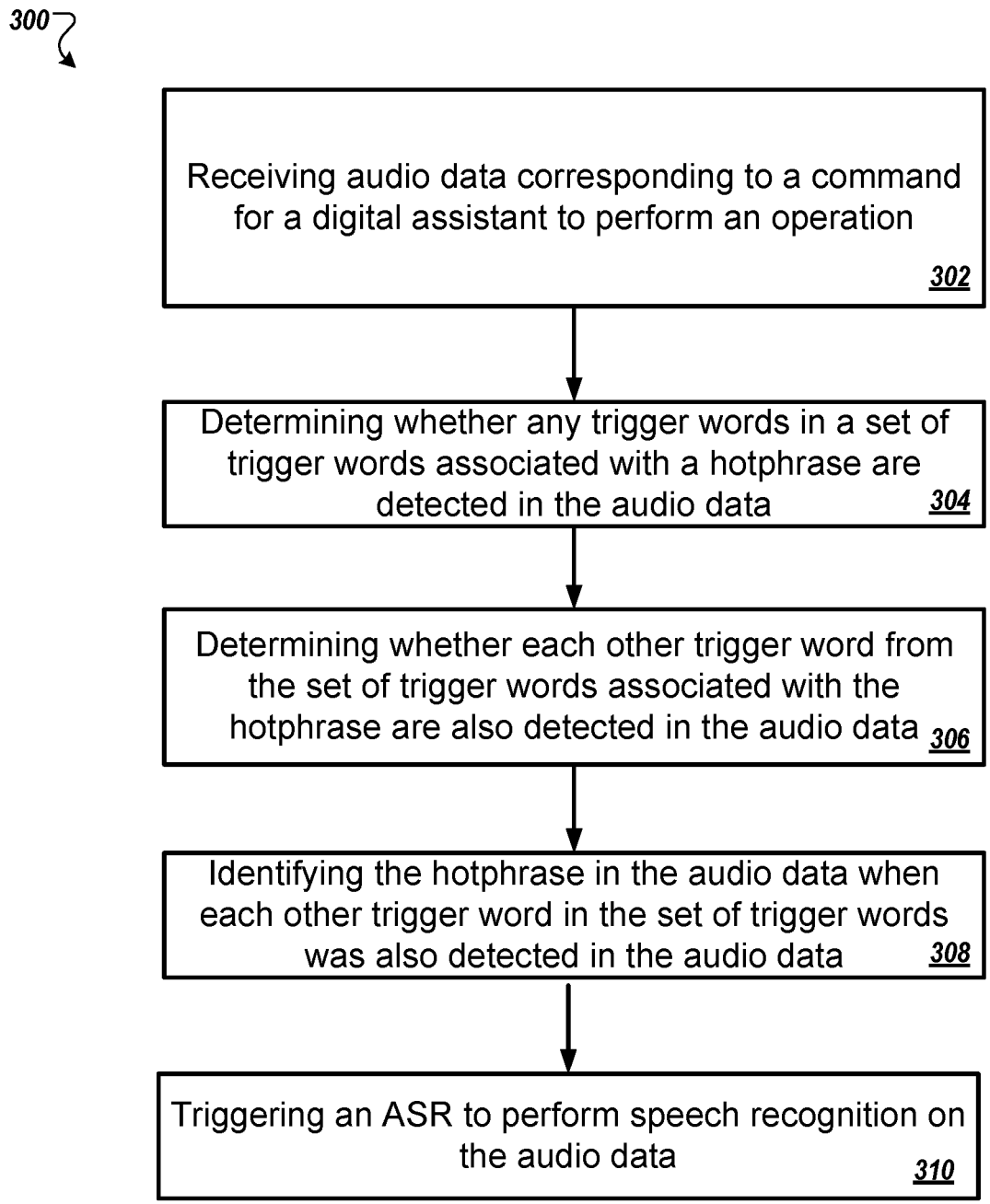
FIG. 3 is a flowchart of an example arrangement of operations for a method of detecting a hotphrase in audio.

FIG. 3 is a flowchart for an exemplary arrangement of operations for a method 300 of detecting a hotphrase 210 in audio data 202 during a fixed-duration time window 220 of the audio data 202. At operation 302, the method 300 includes receiving, at data processing hardware 10 of a user device 104 associated with a user 102, audio data 202 corresponding to an utterance 110 spoken by the user 102 and captured by the user device 104. The utterance 110 includes a command for a digital assistant 109 to perform an operation. The user device 104 may include an assistant-enabled device (AED) executing the digital assistant 109.

The operations 304, 306, 308 for the method 300 are performed during each of a plurality of fixed-duration time windows 220 of the audio data 202. At operation 304, the method 300 includes determining, by the data processing hardware 10, using a hotphrase detector 200 configured to detect each trigger word in a set of trigger words associated with the hotphrase 210, whether any of the trigger words in the set of trigger words are detected in the audio data 202 during the corresponding fixed-duration time window 220. At operation 306, when one of the trigger words in the set of trigger words associated with the hotphrase 210 is detected in the audio data 202 during the corresponding fixed-duration time window 220, the method 300 also includes determining, by the data processing hardware 10, whether each other trigger word in the set of trigger words associated with the hotphrase 210 was also detected in the audio data. At operation 308, when each other trigger word in the set of trigger words was also detected in the audio data, the method 300 also includes identifying, by the data processing hardware, in the audio data corresponding to the utterance, the hotphrase.

At operation 310, the method 300 includes triggering, by the data processing hardware 10, an automated speech recognizer (ASR) to perform speech recognition on the audio data when the hotphrase is identified in the audio data corresponding to the utterance. Here, the ASR may process audio commencing at or before the first trigger word was detected to generate a transcription 120 for the utterance to determine whether each trigger word in the set of trigger words is recognized in the transcript 120.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
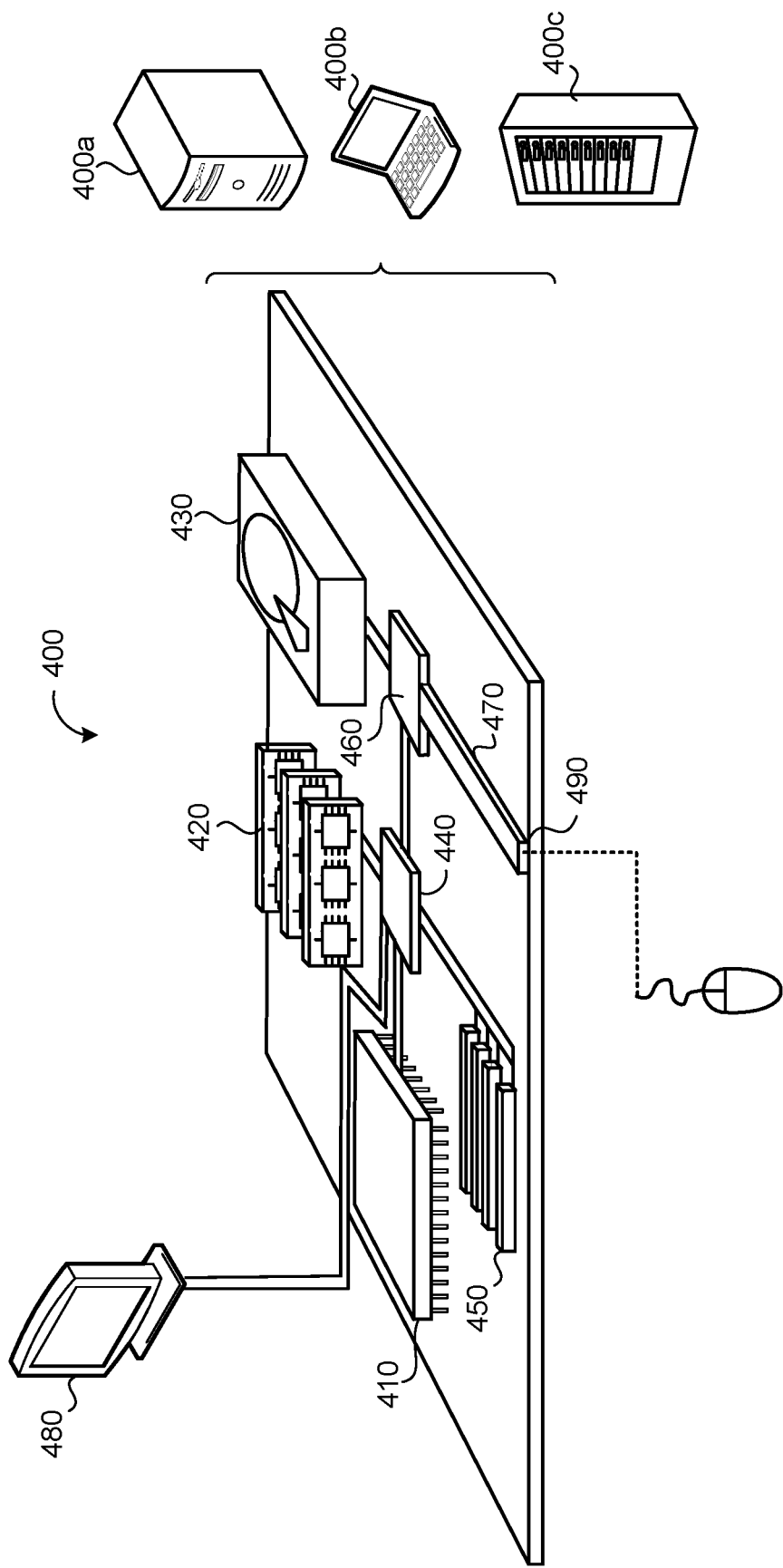
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
    receiving audio data corresponding to a single utterance spoken by a user in streaming audio captured by a microphone, the single utterance comprising:
        a command for a digital assistant to perform an operation;
        a set of trigger words associated with a hotphrase; and
        one or more other words that are not associated with the hotphrase, the one or more other words spoken between a first trigger word in the set of trigger words and a last trigger word in the set of trigger words, each of the one or more other words is different than each trigger word of the set of trigger words;
    before triggering an automated speech recognizer (ASR) to perform speech recognition on the audio data:
        determining that the first trigger word in the set of trigger words is detected in the audio data characterizing the single utterance;
        after determining that the first trigger word in the set of trigger words is detected in the audio data, determining that each other trigger word in the set of trigger words is also detected in the audio data characterizing the single utterance in a sequence that matches a predefined sequential order associated with the hotphrase; and based on determining that the first trigger word and each other trigger word in the set of trigger words is detected in the audio data characterizing the single utterance in the sequence that matches the predefined sequential order associated with the hotphrase, identifying the hotphrase in the audio data; and based on identifying the hotphrase in the audio data, triggering the ASR to perform speech recognition on the audio data.

2. The method of claim 1, wherein triggering the ASR to perform speech recognition on the audio data comprises:
generating a transcription of the single utterance by processing the audio data; and
performing query interpretation on the transcription to identify that the transcription includes the command for the digital assistant to perform the operation.

3. The method of claim 2, wherein generating the transcription comprises:
rewinding the audio data buffered in memory hardware in communication with the data processing to a time at or before the first trigger word in the set of trigger words was detected in the audio data; and
processing the audio data commencing at the time at or before the first trigger word in the set of trigger words to generate the transcription of the single utterance.

4. The method of claim 2, wherein the transcription comprises, between the first trigger word in the set of trigger words and the last trigger word in the set of trigger words, the one or more other words.

5. The method of claim 1, wherein the operations further comprise:
determining that each other trigger word in the set of trigger words is detected in the audio data during a fixed-duration time window commencing when the first trigger word in the set of trigger words was detected in the audio data,
wherein triggering the ASR to perform speech recognition processing is based on determining that each other trigger word in the set of trigger words is detected in the audio data during the fixed-duration time window.

6. The method of claim 1, wherein determining that the first trigger word in the set of trigger words is detected in the audio data characterizing the single utterance comprises:
generating, using a hotphrase detector, a trigger word confidence score indicating a likelihood that the first trigger word is present in the audio data;
detecting the first trigger word in the audio data when the trigger word confidence score satisfies a trigger word confidence threshold; and
buffering, in memory hardware in communication with the data processing hardware, the audio data and a trigger event for the first trigger word detected in the audio data, the trigger event indicating the trigger word confidence score and a timestamp indicating when the first trigger word was detected in the audio data.

7. The method of claim 6, wherein the operations further comprise, based on determining that the first trigger word in the set of trigger words is detected in the audio data characterizing the single utterance, executing a trigger word aggregation routine configured to:
determine that a respective trigger event for each other corresponding trigger word in the set of trigger words is also buffered in the memory hardware; and
when the respective trigger event for each other corresponding trigger word in the set of trigger words is also buffered in the memory hardware, determine a hotphrase confidence score indicating a likelihood that the single utterance spoken by the user includes the set of trigger words,
wherein triggering the ASR to perform speech recognition on the audio data comprises triggering the ASR to perform speech recognition on the audio data when the hotphrase confidence score satisfies a hotphrase confidence threshold.

8. The method of claim 7, wherein executing the trigger word aggregation routine comprises executing a neural network-based model.

9. The method of claim 7, wherein executing the trigger word aggregation routine comprises executing a heuristic-based model.

10. The method of claim 1, wherein the data processing hardware resides on a user device.

11. A system comprising:
data processing hardware; and
memory hardware in communication with the data processing hardware, the memory hardware storing instructions that when executed on the data processing hardware cause the data processing hardware to perform operations comprising:
receiving audio data corresponding to a single utterance spoken by a user in streaming audio captured by a microphone, the single utterance comprising:
a command for a digital assistant to perform an operation;
a set of trigger words associated with a hotphrase; and
one or more other words that are not associated with the hotphrase, the one or more other words spoken between a first trigger word in the set of trigger words and a last trigger word in the set of trigger words, each of the one or more other words is different than each trigger word of the set of trigger words;
before triggering an automated speech recognizer (ASR) to perform speech recognition on the audio data:
determining that the first trigger word in the set of trigger words is detected in the audio data characterizing the single utterance;
after determining that the first trigger word in the set of trigger words is detected in the audio data, determining that each other trigger word in the set of trigger words is also detected in the audio data characterizing the single utterance in a sequence that matches a predefined sequential order associated with the hotphrase; and
based on determining that the first trigger word and each other trigger word in the set of trigger words is detected in the audio data characterizing the single utterance in the sequence that matches the predefined sequential order associated with the hotphrase, identifying the hotphrase in the audio data; and
based on identifying the hotphrase in the audio data, triggering the ASR to perform speech recognition on the audio data.

12. The system of claim 11, wherein triggering the ASR to perform speech recognition on the audio data comprises:
generating a transcription of the single utterance by processing the audio data; and
performing query interpretation on the transcription to identify that the transcription includes the command for the digital assistant to perform the operation.

13. The system of claim 12, wherein generating the transcription comprises:
- rewinding the audio data buffered in memory hardware in communication with the data processing to a time at or before the first trigger word in the set of trigger words was detected in the audio data; and
- processing the audio data commencing at the time at or before the first trigger word in the set of trigger words to generate the transcription of the single utterance.

14. The system of claim 12, wherein the transcription comprises, between the first trigger word in the set of trigger words and the last trigger word in the set of trigger words, the one or more other words.

15. The system of claim 11, wherein the operations further comprise:
- determining that each other trigger word in the set of trigger words is detected in the audio data during a fixed-duration time window commencing when the first trigger word in the set of trigger words was detected in the audio data,
- wherein triggering the ASR to perform speech recognition processing is based on determining that each other trigger word in the set of trigger words is detected in the audio data during the fixed-duration time window.

16. The system of claim 11, wherein determining that the first trigger word in the set of trigger words is detected in the audio data characterizing the single utterance comprises:
- generating, using a hotphrase detector, a trigger word confidence score indicating a likelihood that the first trigger word is present in the audio data;
- detecting the first trigger word in the audio data when the trigger word confidence score satisfies a trigger word confidence threshold; and
- buffering, in memory hardware in communication with the data processing hardware, the audio data and a trigger event for the first trigger word detected in the audio data, the trigger event indicating the trigger word confidence score and a timestamp indicating when the first trigger word was detected in the audio data.

17. The system of claim 16, wherein the operations further comprise, based on determining that the first trigger word in the set of trigger words is detected in the audio data characterizing the single utterance, executing a trigger word aggregation routine configured to:
- determine that a respective trigger event for each other corresponding trigger word in the set of trigger words is also buffered in the memory hardware; and
- when the respective trigger event for each other corresponding trigger word in the set of trigger words is also buffered in the memory hardware, determine a hotphrase confidence score indicating a likelihood that the single utterance spoken by the user includes the set of trigger words,
- wherein triggering the ASR to perform speech recognition on the audio data comprises triggering the ASR to perform speech recognition on the audio data when the hotphrase confidence score satisfies a hotphrase confidence threshold.

18. The system of claim 17, wherein executing the trigger word aggregation routine comprises executing a neural network-based model.

19. The system of claim 17, wherein executing the trigger word aggregation routine comprises executing a heuristic-based model.

20. The system of claim 11, wherein the data processing hardware resides on a user device.

* * * * *